United States Patent
Duge

(10) Patent No.: US 9,546,574 B2
(45) Date of Patent: Jan. 17, 2017

(54) ENGINE LIQUID INJECTION

(75) Inventor: Robert T. Duge, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1117 days.

(21) Appl. No.: 13/336,736

(22) Filed: Dec. 23, 2011

(65) Prior Publication Data

US 2012/0210726 A1 Aug. 23, 2012

Related U.S. Application Data

(60) Provisional application No. 61/427,686, filed on Dec. 28, 2010.

(51) Int. Cl.
*F02C 6/08* (2006.01)
*F02C 6/10* (2006.01)
(Continued)

(52) U.S. Cl.
CPC .............. *F01D 25/32* (2013.01); *F02C 3/305* (2013.01); *F02C 6/08* (2013.01); *F02C 7/143* (2013.01); *F02C 7/185* (2013.01); *F05D 2260/211* (2013.01); *F05D 2260/212* (2013.01); *Y02T 50/675* (2013.01)

(58) Field of Classification Search
CPC ....... F05D 2260/211; F01D 25/32; F02C 3/30; F02C 3/305; F02C 7/1435; F02C 7/185; F02C 6/08; F02C 9/18; F28F 1/00; B64D 13/00–13/08; B64D 2013/0674; B64D 2013/0614; B64D 2013/0611; B64D 2013/0618; B64D 2013/0648; B64D 2013/0622; B64D 2013/0688
(Continued)

(56) References Cited

U.S. PATENT DOCUMENTS 3,604,207 A * 9/1971 Waidelich ........................ 60/262
3,621,656 A * 11/1971 Pacault et al. ................... 60/772
(Continued)

FOREIGN PATENT DOCUMENTS

| EP | 0738655 A2 | 10/1996 |
|----|-----------|---------|
| EP | 1561928 A2 | 8/2005 |
| WO | 9738219 A1 | 10/1997 |

OTHER PUBLICATIONS http://www.jimmydoolittlemuseum.org/html/b52.html, last accessed on Jan. 21, 2011.
(Continued)

*Primary Examiner* — Steven Sutherland
*Assistant Examiner* — Rene Ford
(74) *Attorney, Agent, or Firm* — Barnes & Thornburg LLP

(57) ABSTRACT

A device capable of collecting a condensate from a working fluid is disclosed. The condensate can take the form of a liquid and can be injected into a flow path of an engine. In one form the engine is a gas turbine engine and the liquid is injected upstream of a combustor. The liquid can be produced using a component that cools the working fluid to condense a vapor within it. In one non-limiting form the component is part of a refrigeration system. In addition to producing condensate, the refrigeration system can cool the working fluid to be used as cooled cooling air to a turbine of a gas turbine engine. In another non-limiting embodiment a liquid derived from a blackwater containing waste from an organism can be delivered in whole or in part to a flow path of the engine.

15 Claims, 3 Drawing Sheets

(51) Int. Cl.
  *F02C 3/30* (2006.01)
  *F02C 9/18* (2006.01)
  *F01D 25/32* (2006.01)
  *F02C 7/143* (2006.01)
  *F02C 7/18* (2006.01)

(58) Field of Classification Search
  USPC .......................... 454/71, 76; 165/41, 104.19
  See application file for complete search history.

(56) References Cited

U.S. PATENT DOCUMENTS

| | | | | |
|---|---|---|---|---|
| 3,659,417 | A * | 5/1972 | Grieb | F02C 6/08 454/73 |
| 3,877,218 | A * | 4/1975 | Nebgen | 60/775 |
| 4,537,023 | A * | 8/1985 | Nakamura et al. | 60/775 |
| 5,282,726 | A * | 2/1994 | Warren | 417/243 |
| 5,655,373 | A * | 8/1997 | Yamashita et al. | 60/728 |
| 5,669,217 | A * | 9/1997 | Anderson | 60/775 |
| 5,699,673 | A * | 12/1997 | Hoshino et al. | 62/93 |
| 5,860,283 | A * | 1/1999 | Coleman et al. | 62/87 |
| 6,052,987 | A | 4/2000 | Dressler | |
| 6,089,011 | A | 7/2000 | Shouman | |
| 6,196,165 | B1 * | 3/2001 | Rosen et al. | 123/25 B |
| 6,247,302 | B1 * | 6/2001 | Tsukamoto et al. | 60/39.511 |
| 6,347,605 | B1 * | 2/2002 | Wettergard | 123/25 B |
| 6,389,799 | B1 * | 5/2002 | Hatamiya et al. | 60/39.3 |
| 6,405,686 | B1 * | 6/2002 | Wettergard | 123/25 A |
| 6,412,291 | B1 * | 7/2002 | Erickson | 62/87 |
| 6,467,252 | B1 * | 10/2002 | Payling et al. | 60/39.53 |
| 6,470,668 | B2 | 10/2002 | Payling et al. | |
| 6,588,212 | B1 * | 7/2003 | Wallace et al. | 60/772 |
| 6,722,136 | B2 * | 4/2004 | Daggett | 60/775 |
| 6,739,119 | B2 * | 5/2004 | Erickson | 60/39.53 |
| 6,792,762 | B1 * | 9/2004 | Yamanaka et al. | 60/782 |
| 6,808,145 | B2 | 10/2004 | Burton | |
| 6,907,724 | B2 | 6/2005 | Edelman et al. | |
| 6,968,695 | B2 | 11/2005 | Schmotolocha et al. | |
| 7,272,933 | B2 * | 9/2007 | Reale et al. | 60/775 |
| 7,334,396 | B2 | 2/2008 | Erickson et al. | |
| 7,712,301 | B1 | 5/2010 | Wagner | |
| 2004/0025513 | A1 * | 2/2004 | Walsh | F02C 3/305 60/775 |
| 2005/0193714 | A1 | 9/2005 | Walsh et al. | |
| 2006/0248896 | A1 * | 11/2006 | Hansson | 60/774 |
| 2008/0134667 | A1 | 6/2008 | Pavia et al. | |
| 2008/0256925 | A1 | 10/2008 | Pederson et al. | |
| 2009/0056303 | A1 * | 3/2009 | Araki et al. | 60/39.53 |
| 2009/0188031 | A1 | 7/2009 | Dwyer et al. | |
| 2010/0115960 | A1 * | 5/2010 | Brautsch et al. | 60/772 |

OTHER PUBLICATIONS

Hendricks, Shouse, and Roquemore, "Water Injected Turbomachinery", NASA/TM-2005-212632, Mar. 2005.
http://www.nasa.gov/centers/dryden/news/FactSheets/FS-005-DFRC.html, last accessed on Jan. 21, 2011.
http://www.marchfield.org/gb52d.htm, last accessed on Jan. 21, 2011.
http://www.aviation-history.com/boeing/b47.html, last accessed on Jan. 21, 2011.
International Search Report and Written Opinion, Apr. 18, 2012, PCT/US2011/067298.
Extended European search report in corresponding European application (i.e., EP 11 85 3474), mailed May 4, 2015 (7 pages).

* cited by examiner

ENGINE LIQUID INJECTION

RELATED APPLICATIONS

The present application claims the benefit of U.S. Provisional Patent Application No. 61/427,686 filed Dec. 28, 2010 which is incorporated herein by reference.

GOVERNMENT RIGHTS

The present application was made with United States government support under Contract No. 234721, awarded by the National Aeronautics and Space Administration. The United States government has certain rights in the present application.

TECHNICAL FIELD

The present invention generally relates to power producing engines having liquid injection, and more particularly, but not exclusively, to devices structured to harvest liquid for liquid injection.

BACKGROUND

Providing liquid injection for engines remains an area of interest. Some existing systems have various shortcomings relative to certain applications. Accordingly, there remains a need for further contributions in this area of technology.

SUMMARY

One embodiment of the present invention is a unique system for injecting liquid into a power producing engine. Other embodiments include apparatuses, systems, devices, hardware, methods, and combinations for harvesting liquid and injecting the liquid into a flow path of the engine. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
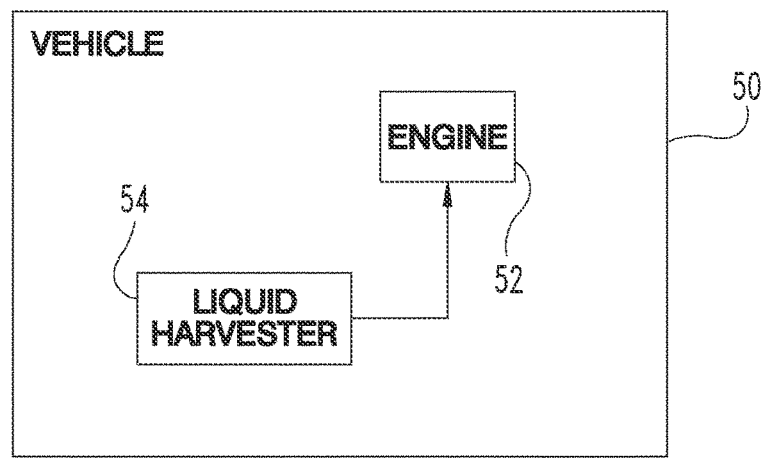
FIG. 1 depicts one embodiment of a vehicle having a liquid harvester.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, one embodiment of a vehicle 50 is shown having an engine 52 and a liquid harvester 54 that is used to provide liquid to the engine 52. The liquid harvester 54 can be used to extract liquid from a passing working fluid in or around the vehicle 50 and engine 52, and/or it can be used to collect a liquid that has been produced within the vehicle 50 and/or engine 52 using another approach. Various embodiments of the liquid harvester 54 will be described further below.

The vehicle 50 can take on a variety of forms in various embodiments. In one non-limiting for the vehicle is an aircraft. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

Figure 2:
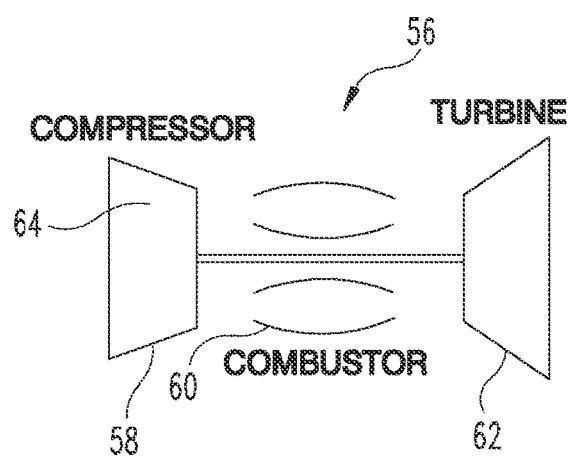
FIG. 2 depicts an embodiment of a gas turbine engine.

The engine 52 can take on a variety of forms such as, but not limited to, a gas turbine engine. In one non-limiting embodiment shown in FIG. 2 the engine 52 is depicted as a gas turbine engine 56. The gas turbine engine 56 in the illustrated form includes a compressor 58, combustor 60, and turbine 62. The gas turbine engine includes a flow path 64 structured to pass a working fluid such as, but not limited to, air. Although only one flow path 64 is depicted in the illustrated embodiment, other forms of the gas turbine engine 52 can have any number of flow paths. During operation the working fluid passing through the flow path 64 is compressed and mixed with a fuel before being combusted in the combustor 60. The products of combustion are then expanded through the turbine 62 and exhausted overboard. Although depicted as a single spool engine in FIG. 2, the gas turbine engine 56 can have any number of spools in other embodiments. The gas turbine engine 56 can take on a variety of forms in other embodiments such as a turbojet, turbofan, turboprop, and turboshaft.

Figure 3:
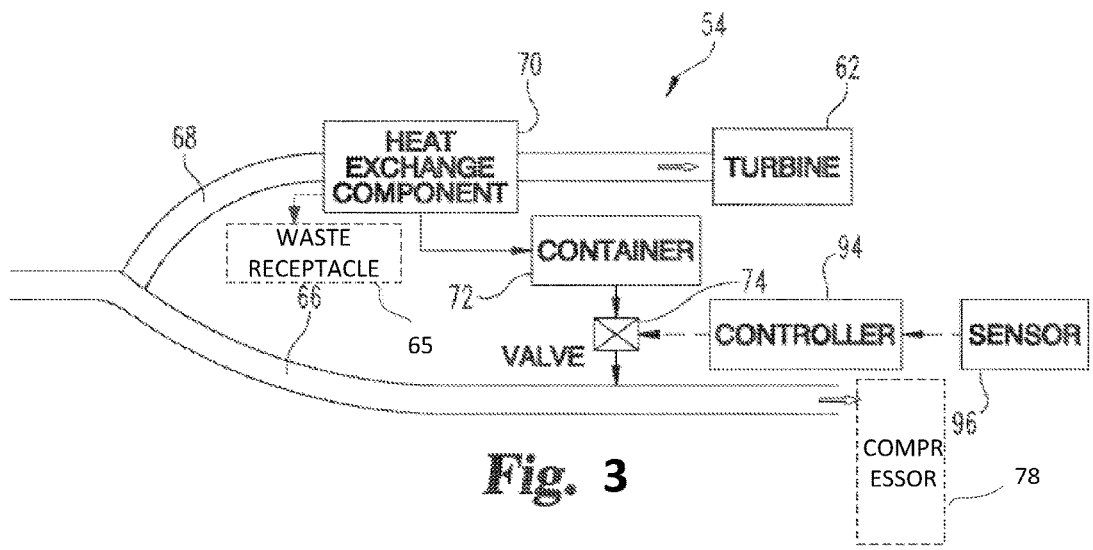
FIG. 3 depicts an embodiment of a liquid harvester.

Turning now to FIG. 3, one embodiment of the liquid harvester 54 is shown in which a liquid is extracted from a passing working fluid and delivered to a flow path of the engine 52. The embodiment of FIG. 3 depicts a compressor flow path 66 from which a working fluid has been extracted and routed to the liquid harvester 54 through a passage 68. The passage 68 can be any size and shape passage appropriate to convey the working fluid extracted from the compressor flow path 66 and route it to a heat exchange component 70. The working fluid extracted from the compressor flow path 66 can be taken from any part of a compressor, and in some cases can be extracted either upstream or downstream of the compressor. As used herein, it will be appreciated that a flow path or passage can be composed of many different conduits, ducts, components, etc. The flow path or passage can include any variety of turns and bends, they can be tortuous, or they can be relatively straight, among any variety of other forms. In one non-limiting sense it will be appreciated that a flow path or passage can be understood as a route in which a charge of air travels as it negotiates a pathway between an inlet and an outlet.

The component 70 is structured in one non-limiting embodiment to cool the working fluid and can either be directly exposed to the portion of working fluid or it can be in thermal communication with the portion of working fluid through an intermediate structure/device/etc. When used as a cooling device the heat exchange component 70 is used to extract a condensate from the working fluid, such as form a condensate of liquid from a vapor in the working fluid. In some forms the heat exchange component 70 can be used to condense a solid from the vapor and from which a liquid is created by a warming of the solid. For example, if a solid condensate is formed on the heat exchange component 70 the solid can be warmed to produce liquid. In any mode of operation, the liquid harvester 54 is structured to extract a condensate, such as but not limited to a liquid water from water vapor in the working fluid.

Though the embodiment of FIG. 3 is shown relative to extracting a portion of working fluid from a flow path of the gas turbine engine and passing it in thermal communication with the heat exchange component 70, it will be appreciated that other embodiments can have other arrangements. To set forth just a few non-limiting examples, the heat exchange component 70 can be placed within or in thermal communication with a flow path of the gas turbine engine to serve as a compressor intercooler, among other potential functions. In another example, the working fluid can be extracted from a cabin 92 compartment air and routed to pass over the heat exchange component 70, thus avoiding extracting a flow from the engine 52. Other variations and combinations are also contemplated herein.

Upon passing in thermal communication with the heat exchange component 70, the working fluid can be routed to any variety of locations within the aircraft 50 and/or engine 52. In one non-limiting form the working fluid can be cooled to provide a cooled cooling air routed to a turbine 62 of the engine. The working fluid cooled by the heat exchange component 70 can also be routed elsewhere such as dumped overboard or delivered to a cabin compartment. For example, if a cabin air were extracted and cooled by the component 70, the cabin air could be returned to the cabin and/or dumped overboard.

In the illustrated form the liquid harvester 54 is shown including a container 72 but such container need not be present in all embodiments of the liquid harvester 54. The container 72 can be constantly replenished during operation of the vehicle 50 or only selectively replenished. For example, the heat exchange member 70 can be selectively activated to harvest condensate from a passing working fluid regardless of whether a cooled working fluid is needed and/or desired. In another non-limiting example, the heat exchange member 70 can be operating to cool the passing working fluid but a condensate harvested from the working fluid can be discharged and not delivered to the container 72. Such a discharge could be overboard or to a waste receptacle 65, to set forth just a few non-limiting examples. The container 72 could alternatively and/or additionally have a valve disposed between it and the heat exchange member 70 that can be operated to modulate a flow of condensate to the container 72.

The condensate collected by the container 72 can be discharged into a flow path of the engine 52. In one non-limiting form the condensate can be discharged into the flow path upon a command received from an operator or device structured to command a release of condensate. In the illustrated embodiment a valve 74 is disposed between the container 72 and the flow path 66 and such valve can be commanded to modulate the flow of condensate. The valve 74 can be activated when desired, can be activated only once during operation of the vehicle 50, or can be activated multiple times. To set forth just one non-limiting example of when the condensate can be discharged into a flow path of the engine 52, a relatively high drag flight maneuver such as a transition from subsonic to supersonic flight can be an occasion in which the valve 74 is commanded to release condensate to improve a thrust of the engine 52. It could also be used during other mission important phases such as during takeoff.

In some forms the vehicle can operate at a variety of speeds and includes a sensor 96 and controller 94, either or both of which can be used to activate the valve 74 and selectively discharge the condensate by, for example, modulating the valve 74.

The sensor 96 can be constructed to measure aircraft flight condition such as speed and altitude, to set forth just two non-limiting examples, and can output any variety of data whether sensed or calculated. For example, the sensor 96 can sense and output conditions such as static temperature, static pressure, total temperature, and/or total pressure, among possible others. In addition, the flight condition sensor 96 can output calculated values such as, but not limited to, equivalent airspeed, altitude, and Mach number. Any number of other sensed conditions or calculated values can also be output. The flight condition sensor 96 provides data to the controller 94 and can output values in either analog or digital form.

The controller 94 can be used to monitor and control operation of the engine 52. The controller 94 can be comprised of digital circuitry, analog circuitry, or a hybrid combination of both of these types. Also, the controller 94 can be programmable, an integrated state machine, or a hybrid combination thereof. The controller 94 can include one or more Arithmetic Logic Units (ALUs), Central Processing Units (CPUs), memories, limiters, conditioners, filters, format converters, or the like which are not shown to preserve clarity. In one form, the controller 94 is of a programmable variety that executes algorithms and processes data in accordance with operating logic that is defined by programming instructions (such as software or firmware). Alternatively or additionally, operating logic for the controller 94 can be at least partially defined by hardwired logic or other hardware. In one particular form, the controller 94 is configured to operate as a Full Authority Digital Engine Control (FADEC); however, in other embodiments it may be organized/configured in a different manner as would occur to those skilled in the art. It should be appreciated that the controller 94 can be exclusively dedicated to modulation of the valve 74, or may further be used in the regulation/control/activation of one or more other subsystems or aspects of the vehicle 50.

The condensate harvested from the working fluid can be delivered to the flow path of the engine 52 upstream of a combustion chamber, such as upstream of the combustor 60. In one non-limiting form the condensate can be delivered to the compressor flow path 66 upstream of a bladed rotor of the compressor 78. In some embodiments the condensate can be delivered to multiple locations in the vehicle 50 and/or engine 52.

Figure 4A:
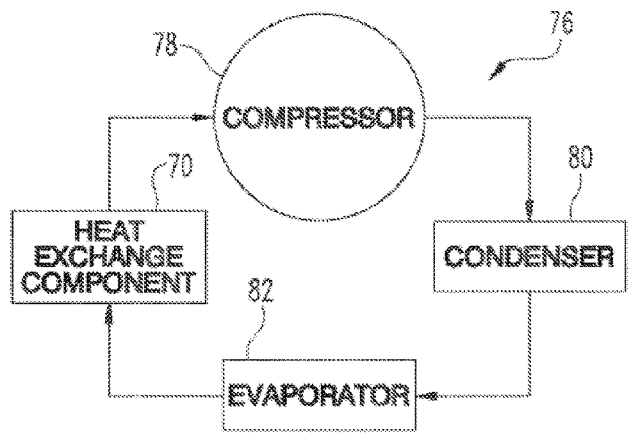
FIG. 4*a* depicts an embodiment of a refrigeration system.
Figure 4B:
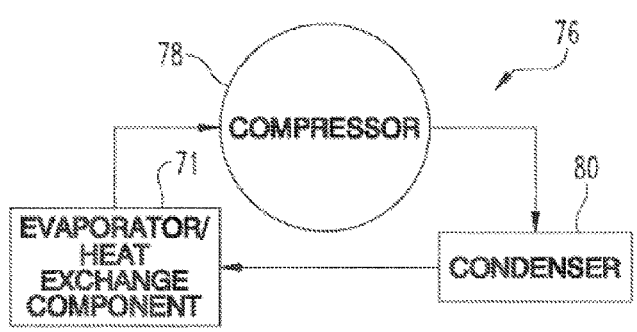
FIG. 4*b* depicts another embodiment of a refrigeration system.

Turning now to FIG. 4a-b, one embodiment of a refrigeration system 76 is shown which includes the heat exchange component 70. In the illustrative form of FIG. 4a the refrigeration system 76 includes a compressor 78, condenser 80, evaporator 82, and the heat exchange component 70. The refrigeration system 76 operates by compressing a refrigerant fluid, condensing the fluid by withdrawing heat from it and expanding the fluid to produce a relatively low temperature. The heat exchange component 70 can receive a relatively cool refrigerant fluid from the evaporator 82 and provide heat to the relatively cool refrigerant fluid from the working fluid, such as the working fluid flowing through the passage 68. As shown in FIG. 4*b*, in some forms the evaporator 82 and heat exchange component 70 can be integrated together. Other types of refrigeration systems are contemplated herein.

Figure 5:
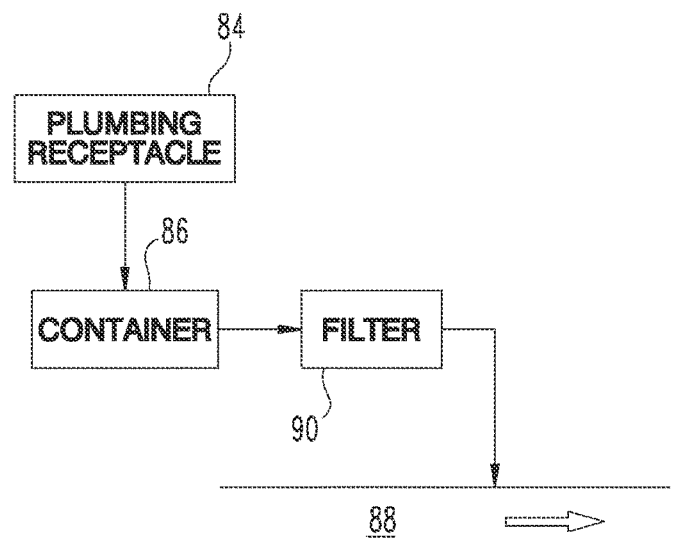
FIG. 5 depicts an embodiment of a liquid harvester.
Figure 6:
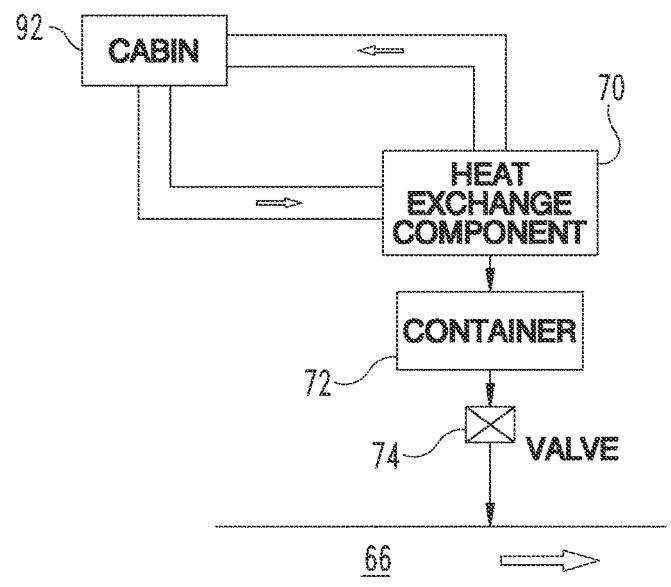
FIG. 6 depicts an embodiment of a liquid harvester.

In another form of the liquid harvester 54, FIG. 5 depicts an embodiment in which waste that is rejected from a living organism, such as a passenger aboard the vehicle 50 (depicted in FIG. 1), can be collected and delivered to the engine 52. Many living organisms reject waste such as urine or solid waste. This waste can be collected via a container and then supplied either in whole or in part to the engine 52 when needed. The embodiment depicted in FIG. 5 illustrates a plumbing receptacle 84 that is used to receive a waste discharged from, say, a passenger. The plumbing receptacle 84 can take many forms including a urinal and/or a toilet, among potential others. When the waste is moved from the plumbing receptacle 84 it is usually moved within a stream of liquid that is sometimes referred to as blackwater. Blackwater is a term that usually includes organism waste and can be differentiated from the term greywater which is generally understood to mean liquid from drains, sinks, etc. resulting from, for example, washing, rinsing, or bathing and that do not contain biological waste from an organism. The blackwater can be collected in a waste container 86 before being delivered to a flow path 88 of the engine 52. The waste container 86 can be a stand alone container separate from the plumbing receptacle 84 or it can be integrated into it. In some forms the container 86 can also be used to receive a greywater from a plumbing receptacle such as a sink, to set forth just one non-limiting example. In the illustrated embodiment the blackwater can be treated via a filter 90, but not all embodiments need include a filter 90. Some embodiments of the liquid harvester 54 can include a grinder to assist in reducing waste to a liquid form. Some portion of the liquid from the plumbing receptacle delivered to the flow path of the engine 52 can include hydrocarbons which may be burned in a combustion chamber.

One aspect of the present application provides an apparatus comprising a vehicle having an internal combustion engine and a fluid flow path leading from an intake to a combustion chamber and to an exhaust, a cooling system having a heat exchange member structured to cool a working fluid in a passage, the working fluid including a vapor, and a liquid flow path in communication with the fluid flow path of the internal combustion engine and structured to convey a liquid condensed from the working fluid via the heat exchange member and route the liquid into the fluid flow path of the internal combustion engine.

A feature of the present application provides wherein the working fluid in the passage is in fluid communication with the fluid flow path, wherein the liquid flow path is structured to deliver the liquid upstream of the combustion chamber, the liquid includes water, and the water injection alters a thermodynamic cycle of the internal combustion engine.

Another feature of the present application further includes a container for collecting the liquid condensed from the working fluid, the liquid flow path downstream of the container.

Yet another feature of the present application provides wherein the combustion chamber is a combustor of a gas turbine engine.

Still yet another feature of the present application provides wherein the vehicle is an aircraft and the liquid is selectively delivered to the gas turbine engine during operation.

A further feature of the present application provides wherein the working fluid is routed to a cooled turbine section of a gas turbine engine subsequent to being cooled by the heat exchange member.

A still further feature of the present application provides wherein the cooling system is a refrigerant based system.

Another aspect of the present application provides an apparatus comprising a gas turbine engine operable to produce power for a vehicle and structured to flow a working fluid having a vapor substance, a liquid harvester structured to cool the working fluid and condense the vapor substance, and a conduit in communication with a flow path of the gas turbine engine and structured to pass the condensed vapor substance from the liquid harvester into the flow path.

A feature of the present application further includes a vehicle, wherein the vehicle is an aircraft, and wherein the working fluid is extracted from a compressor and a portion is delivered to a turbine of the gas turbine engine.

Another feature of the present application further includes a collection vessel arranged to store the condensed vapor substance.

Still another feature of the present application further includes a second conduit disposed between the liquid harvester and the collection vessel and having a discharge at the collection vessel.

Yet still another feature of the present application provides wherein the liquid harvester is a heat absorbing component of a cooling system.

A further feature of the present application provides wherein the cooling system provides cooled cooling air to a turbine of the gas turbine engine.

A still further feature of the present application provides wherein the cooling system is a vapor cycle refrigeration system.

Yet another aspect of the present application provides an apparatus comprising a vehicle, a gas turbine engine configured to power the vehicle, the gas turbine engine having a water based liquid injection system, and means for extracting a water for use within the water based liquid injection system.

A feature of the present application provides wherein the means for extracting includes a means for cooling a working fluid.

Still yet another aspect of the present application provides a method comprising operating an internal combustion engine to produce a power for a vehicle, powering a cooling component to condense a liquid from a working fluid, and injecting the condensed liquid into the internal combustion engine.

A feature of the present application provides wherein the injecting occurs upstream of a combustion chamber, and wherein the working fluid is removed from a flow of working fluid prior to the combustion chamber.

Another feature of the present application further includes routing the condensed liquid to a storage container prior to the injecting.

Still another feature of the present application further includes selectively removing liquid from the storage container as a condition of the injecting.

Yet still another feature of the present application further includes cooling a portion of the internal combustion engine with the working fluid cooled by the cooling component.

A further feature of the present application provides wherein the internal combustion engine is a gas turbine engine, and wherein the portion of the internal combustion engine is a turbine.

A still further feature of the present application further includes a refrigerant based cooling system that includes the cooling component, wherein the working fluid is air, and wherein the refrigerant based cooling system is operable to cool the working fluid to provided cooled cooling air to the turbine.

A further aspect of the present application provides an apparatus comprising a vehicle having a waste receptacle for receiving blackwater including human waste from a plumbing fixture, and a gas turbine engine coupled with the vehicle and having a liquid injection system in fluid communication with the waste receptacle, the liquid injection system structured to receive liquid from the waste receptacle and deliver it to a flow path of the gas turbine engine.

A feature of the present application provides wherein the plumbing fixture is one of a toilet and a urinal.

Another feature of the present application provides wherein the plumbing fixture includes a conduit through which human waste is conveyed to the waste receptacle.

Still another feature of the present application provides wherein the waste receptacle is also structured to receive grey water from a washing or rinsing operation.

Still yet another feature of the present application further includes one of a filter and grinder for processing the blackwater upstream of the gas turbine engine flow path.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   a vehicle having an internal combustion engine and a fluid flow path leading from an intake to a combustion chamber and to an exhaust;
   an extraction flow passage structured to withdraw working fluid from a location upstream of the combustion chamber and downstream a compressor;
   a cooling system having a heat exchange member structured to cool the extracted working fluid, the extracted working fluid including a vapor; and
   a liquid flow path in communication with the fluid flow path of the internal combustion engine and structured to convey a liquid condensed from the extracted working fluid via the heat exchange member and route the liquid into the compressor;
   wherein the working fluid is cooled by the heat exchange member and is routed subsequent to the heat exchange member to a turbine thereby cooling the turbine.

2. The apparatus of claim 1, wherein the extracted working fluid is in fluid communication with the fluid flow path, wherein the liquid flow path is structured to deliver the liquid upstream of the combustion chamber, the liquid includes water, and the water injection alters a thermodynamic cycle of the internal combustion engine.

3. The apparatus of claim 1, which further includes a container for collecting the liquid condensed from the working fluid, the liquid flow path downstream of the container.

4. The apparatus of claim 3, wherein the combustion chamber is a combustor of a gas turbine engine, and wherein the cooling system is a vapor compression cooling system having an evaporator, wherein the heat exchange member and the evaporator are integrated together.

5. The apparatus of claim 4, wherein the vehicle is an aircraft and the liquid is selectively delivered to the gas turbine engine during operation.

6. The apparatus of claim 1, wherein the cooling system is a refrigerant based system.

7. An apparatus comprising: a vehicle;
   a gas turbine engine configured to power the vehicle, the gas turbine engine having a water based liquid injection system;
   a cooling system having a cooling system refrigerant;
   a passageway leading from a compressor flow path and configured to carry fluid from a bladed rotor of a compressor and into thermal communication with the cooling system refrigerant;
   and
   means for cooling the fluid from the compressor and extracting water from the compressor fluid for use within the water based liquid injection system;
   wherein water-based liquid injection occurs upstream of the bladed rotor of the compressor,
   wherein the fluid is routed subsequent to the means for cooling to a turbine thereby cooling the turbine.

8. A method comprising:
   operating a gas turbine engine to produce a power for an aircraft;
   withdrawing air from the gas turbine engine prior to a combustion of fuel and air;
   powering a cooling component useful to condense a liquid from the air that is withdrawn from the engine prior to combustion;
   measuring a flight condition of the aircraft with a sensor;
   modulating a valve in response to the sensor with a controller to release the liquid; and
   injecting the liquid that is condensed into the gas turbine engine to improve a thrust of the gas turbine engine;
   the method further includes routing the condensed liquid to one of a storage container and a waste receptacle configured to receive human waste from a plumbing fixture, each of which is in fluid communication with the cooling component.

9. The method of claim 8, wherein the injecting occurs upstream of the combustion chamber, and wherein the working fluid is removed from a flow of the working fluid prior to the combustion chamber.

10. The method of claim 8, which further includes cooling a portion of the gas turbine engine with the working fluid cooled by the cooling component.

11. The method of claim 10, wherein the portion of the gas turbine engine is a turbine.

12. The method of claim 11, which further includes a refrigerant based cooling system that includes the cooling component, wherein the working fluid is air, and wherein the refrigerant based cooling system is operable to cool the working fluid to provide cooled cooling air to the turbine.

13. An apparatus comprising:
an aircraft having a gas turbine engine useful to provide power air to the aircraft, the gas turbine engine including a compressor, combustor, turbine, and exhaust;
a vapor cycle refrigeration system having a condenser and evaporator that circulate a vapor cycle working fluid, the evaporator in thermal contact with a fluid flow stream extracted solely from a cabin of the aircraft, the thermal contact structured to produce a liquid water;
a cooled cooling air circuit that provides cooled air to the turbine;
a water injection system capable of harvesting the liquid water produced by thermal contact of the evaporator of the vapor cycle refrigeration system and the fluid flow stream extracted from the cabin,
the water injection system structured to inject the liquid water into a flow path of the gas turbine engine, wherein the liquid water can be stored for selective use during operation of the aircraft: and
a controller in command communication with a water injection system valve, the controller structured to issue a command to release the liquid water via the valve to improve a thrust of the gas turbine engine.

14. The apparatus of claim 13, wherein the controller issues the command to release liquid water via the valve during a transition between subsonic and supersonic flight.

15. The apparatus of claim 13, wherein the cooled cooling air is cooled via action of the vapor cycle refrigeration system.

\* \* \* \* \*